US012776604B2

(12) United States Patent
Rosan et al.

(10) Patent No.: US 12,776,604 B2
(45) Date of Patent: Oct. 27, 2026

(54) HOUSING FOR AN ELECTRICAL LAMELLA SPRING CONTACT AND CONTACT ASSEMBLY WITH A HOUSING

(71) Applicant: TE Connectivity Germany GmbH, Bensheim (DE)

(72) Inventors: Daniel Rosan, Bensheim (DE); Willi Dietrich, Bensheim (DE); Soenke Sachs, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 378 days.

(21) Appl. No.: 18/497,058

(22) Filed: Oct. 30, 2023

(65) Prior Publication Data

US 2024/0154342 A1 May 9, 2024

(30) Foreign Application Priority Data

Nov. 8, 2022 (DE) ......................... 102022129423.4

(51) Int. Cl.
*H01R 13/422* (2006.01)
*H01R 13/11* (2006.01)

(52) U.S. Cl.
CPC ........... *H01R 13/422* (2013.01); *H01R 13/11* (2013.01)

(58) Field of Classification Search
None
See application file for complete search history.

(56) References Cited

U.S. PATENT DOCUMENTS 5,681,190 A * 10/1997 Childs .................... H01R 13/11 439/852
6,475,040 B1 11/2002 Myer et al.
10,193,247 B1 1/2019 Glick et al.
10,297,941 B2 * 5/2019 Huang ................. H01R 13/114
10,403,998 B2 * 9/2019 Hayashi ............... H01R 13/114
(Continued)

FOREIGN PATENT DOCUMENTS

CN 203218529 U 9/2013
CN 204858032 U 12/2015
(Continued)

OTHER PUBLICATIONS

Office Action for corresponding JP Application No. 2023189138 dated Jun. 24, 2025 (12 pages).
(Continued)

*Primary Examiner* — Ross N Gushi
(74) *Attorney, Agent, or Firm* — Jay J. Hoette; Carroll, Hoette & Butscher, LLC

(57) ABSTRACT

A housing for an electrical lamella spring contact, which is designed for the insertion of a pin contact, includes a lamella spring contact receptacle into which the lamella spring contact can be inserted along a longitudinal direction of the housing, wherein the housing has two side walls delimiting the lamella spring contact receptacle at adjacent sides, extending along the longitudinal direction and being at an angle to each other, and a support spring for supporting a spring portion of the lamella spring contact, the support spring extending from one side wall to the other side wall. A contact assembly is provided having the housing and a lamella spring contact disposed in the lamella spring contact receptacle and having a lamella spring supported by the support spring.

19 Claims, 6 Drawing Sheets

(56) References Cited

U.S. PATENT DOCUMENTS

| | | | |
|---|---|---|---|
| 2002/0076999 | A1 | 6/2002 | Chen |
| 2009/0053941 | A1 | 2/2009 | Stuklek |
| 2017/0310033 | A1 | 10/2017 | Miled |
| 2021/0234297 | A1 | 7/2021 | Gingrich, III |

FOREIGN PATENT DOCUMENTS

| | | | |
|---|---|---|---|
| DE | 202004006433 | U1 | 9/2004 |
| DE | 102019133033 | A1 | 6/2021 |
| JP | S54102590 | A | 8/1979 |
| JP | 2005056792 | A | 3/2005 |
| JP | 20138645 | A | 1/2013 |
| JP | 2014232701 | A | 12/2014 |
| JP | 5673390 | B2 | 2/2015 |
| JP | 2019504458 | A | 2/2019 |
| JP | 2020528659 | A | 9/2020 |
| KR | 20170092680 | A | 8/2017 |

OTHER PUBLICATIONS

Office Action for corresponding KR Application No. 2024111412978 dated Dec. 24, 2024 (6 pages).

Office Action for corresponding JP Application No. 2023189138 dated Jan. 7, 2025 (15 pages).

Office Action for corresponding JP Application No. 2023189138 dated Jan. 6, 2026 (11 pages).

Office Action for corresponding EP Application No. 23208610.8 dated Feb. 2, 2026 (13 pages).

* cited by examiner

HOUSING FOR AN ELECTRICAL LAMELLA SPRING CONTACT AND CONTACT ASSEMBLY WITH A HOUSING

CROSS REFERENCE TO RELATED APPLICATIONS

This application claims the benefit of DE Application No. 102022129423.4 filed 8 Nov. 2022, the subject matter of which is herein incorporated by reference in its entirety.

BACKGROUND OF THE INVENTION

The subject matter herein relates to electrical connector systems.

Metal surfaces lose their electrical conductivity due to wear, such as corrosion and fretting. To avoid this, the surfaces can be treated with electron beams. However, such treatment results in modification of the material underlying the treated surface, as the electron beam removes material. For example, lamella springs commonly used in electrical connector systems may be treated with an electron beam to enhance the conductivity of their treated surface. The electron beam treatment has an adverse effect on the spring properties of such treated lamella springs.

A need remains for a contact assembly designed to make a lamella spring contact more reliable.

BRIEF DESCRIPTION OF THE INVENTION

In one embodiment, a housing for an electrical lamella spring contact designed for the insertion of a pin contact is provided. The housing includes a lamella spring contact receptacle into which the lamella spring contact can be inserted along a longitudinal direction of the housing. The housing may have two side walls delimiting the lamella spring contact receptacle on adjacent sides, extending along the longitudinal direction and being at an angle to each other, wherein the housing includes a support spring for supporting a spring portion of the lamella spring contact, and the support spring extends from one side wall to the other side wall.

Optionally, the support spring can resiliently support the lamella spring contact in at least two spatial directions. Furthermore, the support spring may provide a rest point (or a rest position) for deflection in both transverse directions to the longitudinal direction. The support spring can electrically conductively contact and mechanically support the lamella spring contact at the support section. Due to the rest position of the support spring, the mechanical support of the lamella spring contact is particularly stable and reliable. Furthermore, such a rest position of the support spring is especially advantageous when the support spring is welded to the inserted lamella spring contact in the interior through laser beam welding.

The housing can be further improved by the following exemplary embodiments, which are advantageous on their own and can be combined with each other arbitrarily.

According to an exemplary embodiment, the support spring may be formed from the material of the side walls. In this case, the support spring can be surrounded by gaps in the material of the side walls. The support spring can be formed by a cutout in the material. Furthermore, the support spring can be punched out of the material of the side walls or formed by a stamping process.

Advantageously, according to this embodiment, the support spring is mechanically stable and electrically conductively connected to the housing.

According to another exemplary embodiment, the support spring can be designed as a spring tongue formed from the material of the side walls. Here, the spring tongue extends from one side wall to the other side wall, for example, forming an edge, with the free end or tongue tip of the spring tongue located within the plane of the other side wall of the housing.

According to another exemplary embodiment, the side walls can abut to form an edge of the housing, wherein the support spring extends around the edge and also forms an edge. In other words, the spring tongue or support spring is bent around the longitudinal direction when it forms an edge.

According to another exemplary embodiment, the support spring can be connected to one side wall via a base, and a free end of the support spring lies in the plane of the other side wall. With the term "end lying in a plane with the side wall," it is meant that the end or point lies within a plane coplanar with the side wall.

According to another exemplary embodiment, the support spring may taper toward the free end. Advantageously, this can adjust the effective spring force of the support spring. Additionally, the support spring may run at an acute angle to the longitudinal direction, causing the free end to be offset from the transverse center of the housing or the other side wall.

According to another exemplary embodiment, the support spring may have a knee, with a curved and support section formed between the knee and the free end, curving and projecting toward the lamella spring contact receptacle. In other words, the support spring has such a support section between the knee and the free end. Furthermore, the support spring may be angled, meaning the support spring or spring tongue is bent at an angle to the surface normal of the other side wall.

Optionally, a welding window may be located in the support section, which can be formed as a round or rectangular gap in the material of the support spring.

According to another exemplary embodiment, the support spring may be angled at an acute angle with respect to the longitudinal direction. This embodiment provides an alternative for adjusting the spring force of the support spring. Here, the position of the spring tip can be adjusted to an offset lamella spring contact.

According to another exemplary embodiment, the support spring may have a notch or slot at the knee. The slot or notch enhances the elastic spring effect of the support spring, effectively reducing the spring stiffness of the support spring. In other words, the notch or slot may be arranged at the throat of the knee. The throat of the knee is located preferably at a transition region of the support spring within the other side wall.

According to another exemplary embodiment, the free end of the support spring may split into several adjacent projections (or free ends). In other words, the support spring, which is designed as a spring tongue, may have multiple tongue tips. Each individual tongue tip can be connected to a separate lamella spring contact. Preferably, the adjacent projections or free ends lie in the same plane as the other side wall. Each of them may form a support section.

According to another exemplary embodiment, the housing may have a further support spring.

Advantageously, such an embodiment with at least two support springs can provide greater support force to the lamella spring contact (e.g., a lamella spring) than an embodiment with only one support spring. Furthermore, in this case, the housing can be electrically conductively connected or welded to the lamella spring contact at each support spring.

According to another exemplary embodiment, the length of the further support spring may be shorter than that of the (first) support spring. The length may be represented as the projected length of the support spring along the longitudinal direction of the housing. For example, the projected length of the support spring can be calculated based on the projection of the support spring onto the other side wall. Alternatively, the length of the respective support springs may denote the extension of the respective support springs along the longitudinal direction within the other side wall.

Varying the length of the support springs provides another parameter to adjust the spring effect. Thus, the support spring can be made more or less elastic, depending on the projected length of the support spring along the longitudinal direction. This embodiment allows to selectively increase or modify normal or insertion forces applied in contact with a spring contact, as provided by a spring contact (e.g., a lamella spring) located inside the housing.

According to another advantageous embodiment, the housing may have another support spring and a third side wall opposite to the one wall, where the further support spring extends from the third side wall to the other side wall. This embodiment advantageously reduces the space required on the side walls for the bases of the respective support springs. In particular, it allows space to be saved on the one side wall that carries the first support spring, or the side wall is designed mechanically stronger because the further support spring is supported by the opposite side wall and not by the one side wall.

According to another advantageous embodiment, the housing may have a further support spring, where the further support spring also extends from one side wall to the other side wall, and a base of the further support spring is offset longitudinally from a base of the support spring. In this embodiment, a further support spring can be formed from the limited space of the one side wall, allowing an inserted lamella spring contact to be supported by at least two support springs, each encompassing a support section.

According to another advantageous embodiment, the free ends of the two support springs may be offset from each other along a transverse direction to the longitudinal direction. In other words, the free ends are arranged laterally or transversely offset from the center of the side wall. Alternatively, the free ends of the support springs may be positioned successively in the longitudinal direction. According to another advantageous embodiment, the free ends of the support springs may be offset from each other, wherein the offset lies within a plane coplanar with the other side wall.

According to another advantageous embodiment, the free ends may be arranged in alignment behind each other. Alternatively, or cumulatively, the free ends of the support springs may face each other.

According to another advantageous embodiment, the support spring may have a welding window and may be designed and connected to be welded through laser beam welding to a lamella spring contact inserted into the lamella spring contact receptacle. The welding window can be formed by a gap, recess, slot, and/or cut in the material of the corresponding side wall.

Advantageously, this generates a particularly stable connection between the spring contact and the housing. This is advantageous for both the mechanical support of the spring contact and the electrical conductive contact between the spring contact and the housing.

In another embodiment, a contact assembly is provided with a housing according to any one of the previously described exemplary embodiments and a lamella spring contact, which is located in the lamella spring contact receptacle and has a lamella spring supported by the support spring.

According to another advantageous embodiment, the lamella spring may be welded to the housing. For example, through a laser beam welding process, preferably at an end region or support section of the support spring. In this region or section, the support spring may have a welding window or a welding point.

According to another advantageous embodiment of the contact assembly, the support spring and the lamella spring can each have sections projecting and/or receding in the longitudinal direction and in succession in the longitudinal direction, which are in engagement with each other when the lamella spring is fully inserted into the lamella spring contact receptacle.

Advantageously, the mechanical support as well as the electrical connection between the two components is increased or made more reliable.

According to another advantageous embodiment of the contact assembly, the support spring and the lamella spring can each have a convex or concave shaped region, wherein the convex (or concave) shaped region of the support spring and of the lamella spring are in form-fittingly engaged with each other when the lamella spring is fully inserted into the lamella spring contact receptacle.

According to another advantageous embodiment of the contact assembly, the support spring and the lamella spring may each have a plane-parallel end region, wherein the end region of the support spring contacts the end region of the lamella spring when the lamella spring is fully inserted into the lamella spring contact receptacle, wherein the support spring is bent in its end region transversely to the longitudinal direction towards the lamella spring contact receptacle.

According to another advantageous embodiment, the lamella spring can be welded together with the housing within the convex or concave shaped region. In particular, a welding point may be located within the tip portion, support portion, or end portion, where a welding window is formed from the material of the support spring.

In a further embodiment, a method for constructing a contact assembly is provided. The method may includes providing a housing according to any of the previous exemplary embodiments, inserting a lamella spring contact into the housing, and laser beam welding the housing to the lamella spring contact.

In another embodiment, a housing is provided for a lamella spring contact, comprising a main body designed to enclose the lamella spring contact on at least two sides and to receive it along a longitudinal direction of the main body, wherein the main body has at least two adjacent flat walls that define a space for accommodating the lamella spring contact. The at least two adjacent flat walls can extend along the longitudinal direction of the main body. Furthermore, the main body may comprise a support spring formed by gaps in the adjacent walls, wherein the support spring begins in one of the adjacent walls, includes a tip portion or end section arranged in the other of the adjacent walls, and extends along the longitudinal direction of the main body within the other of the adjacent walls. The tip portion may have a support section designed to contact the lamella spring contact within the space defined by the flat walls (hereinafter referred to as the interior of the housing).

According to an exemplary embodiment, the support spring is a first support spring whose tip portion is arranged in the other adjacent wall, and the main body comprises a second support spring formed by gaps in the other of the adjacent walls. The second support spring may have a different tip portion located in the other of the adjacent flat walls and another support section designed to contact the lamella spring contact within the space defined by the flat walls. In such an embodiment with two support springs, the housing can provide greater support force to the lamella spring contact (e.g., a lamella spring) than an embodiment with only one support spring.

According to another advantageous embodiment, the second support spring is arranged in a third flat wall opposite the one wall. In other words, the second support spring does not begin in the same one of the adjacent walls but in an opposite wall of the main body. According to this embodiment, the main body can substantially form a U-shape when projected onto the normal plane of the longitudinal direction of the main body. According to this embodiment, the main body includes another third flat wall opposite one of the adjacent side walls, wherein the second support spring begins in the third wall or the base of the support spring is arranged there and is formed in gaps in the third and the other adjacent walls.

This embodiment is advantageous because the support springs can be arranged in a space-saving manner on the side walls of the main body.

According to another advantageous embodiment, the second support spring extends antiparallel to the longitudinal direction of the main body or housing, wherein a (projected) length of the first support spring within the other of the adjacent walls along the longitudinal direction is shorter than a (projected) length of the second support spring within the same wall along the longitudinal direction.

According to another advantageous embodiment, the support spring tapers towards the tip portion within the second wall in terms of its extension transverse to the longitudinal direction. This embodiment allows the support spring to be designed in a space-saving manner while simultaneously adapting the elasticity of the spring. In other words, the spring effect of the support spring can be modified by adjusting the width, namely how much the support spring tapers towards the tip portion.

According to another advantageous embodiment, the support spring extends at an acute angle along the longitudinal direction. In other words, the support spring does not run along a central axis line of the main body but at an acute angle. Thus, the lateral or transverse position of the support section of the support spring can be adjusted as desired.

According to another advantageous embodiment, the tip portion of the support spring may have at least two adjacent free ends or support sections formed by gaps in the other of the adjacent walls. In other words, the tip portion is divided into multiple parts. Advantageously, a support spring can now simultaneously mechanically support multiple lamella spring contacts and/or be electrically conductively connected to them at one or more support sections. This increases the reliability of the housing since a complete contact failure requires contact failures at multiple redundant connection points.

According to another advantageous embodiment, the support section is designed to be connected to the received lamella spring contact by laser beam welding. This embodiment can be combined arbitrarily with the aforementioned embodiments. Advantageously, the spring effect of the support spring, in combination with the laser beam welding process, produces a particularly strong connection to the lamella spring contact. The welded connection to the lamella spring contact is therefore particularly stable on one side and still resilient due to the support spring on the other side, ensuring optimal use of the housing with an inserted tab contact or pin contact. A tab contact has a rectangular shape or base are in projection, wherein the aspect ratios of the sides that span the base are being different. A pin contact can be drawn from a wire and preferably has the same aspect ratios. In other words, the pin contact has a square base are. Alternatively, the pin contact may have a circular base are.

According to another advantageous embodiment, the tip portion of the support spring may have a convex shape, which is designed to contact a convex shaped portion of the lamella spring contact in an adjoining or form-fitting manner. In this embodiment, the contact area of the support spring with the lamella spring contact or the lamella spring is increased. At the same time, the connection point of the housing can be made in close proximity to a tab contact, pins, or connectors inserted into the lamella spring contact. Alternatively, the tip portion of the support spring may have a plane-parallel shape, which is designed to contact a plane-parallel portion of the electrical connector in an adjoining manner.

According to another advantageous embodiment, the support spring may have a notch. In particular, the support spring may have a body portion in the other side wall, wherein the body portion is arranged opposite the tip portion within the other side wall, and the support spring extends in the body portion transversely to the longitudinal direction. The body portion is part of a knee formed by the support spring. At the throat of the knee, the support spring may have a notch or slit. Advantageously, this allows the spring effect of the support spring to be further adjusted. With the same length of the support spring, the support spring can be made more elastic by adding a notch or slit.

According to another advantageous embodiment, the housing is designed as a crimp housing. Here, the housing is designed to accommodate a conductor or cable at one or more ends.

According to another advantageous embodiment, the housing is made of a stamped and bent part.

The subject matter will be explained in more detail below with reference to the drawings based on several exemplary embodiments, the different features of which can be combined with each other arbitrarily according to the above remarks. In particular, individual features can be added to the described embodiments in accordance with the above explanations if the effect of these features is necessary for a particular application. Conversely, individual features can be omitted in the described embodiments if the technical effect of these features is not relevant in a specific application. In the drawings, similar, identical, and functionally identical elements are provided with identical reference signs, as far as this is expedient.

DETAILED DESCRIPTION OF THE INVENTION

Figure 1:
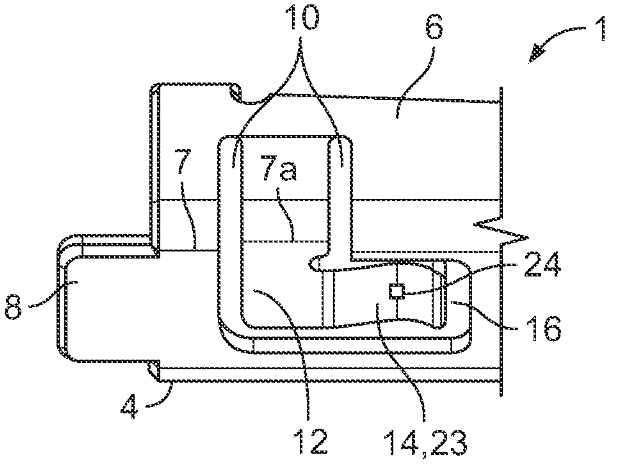
FIG. 1 illustrates a schematic perspective view of a housing according to an exemplary embodiment.

The schematic structure of the housing 1 is described below with reference to the exemplary embodiment in FIG. 1. The housing 1 is designed to receive or accommodate a lamella spring contact 2 along a longitudinal direction L. The housing 1 can be made of an electrically conductive material and preferably has a main body 4 that is designed to enclose the lamella spring contact 2 on at least two sides. Preferably, the main body 4 extends along the longitudinal direction L of the housing 1. Furthermore, the main body 4 has at least 2 adjacent flat walls 6 and 8, which delimit the lamella spring contact receptacle 5 of the lamella spring contact 2. The adjacent walls 6 and 8 can abut each other at an acute or a right angle and also form an edge 7. The side walls abut to form the edge 7 of the housing 1. In this case, the support spring 12 also extends around the edge 7 and likewise forms an edge 7*a*. In other words, the support spring is bent around the longitudinal direction L.

Furthermore, the adjacent flat side walls 6 and 8 can delimit a rectangular base of the main body 4 in a projection onto a transverse plane to the longitudinal direction L of the housing 1. Alternatively, the border resulting from the projection of the at least two adjacent side walls 6 and 8 with a third side wall onto the transverse plane may have a U-shape.

Alternatively, this border may also have a triangular shape. Furthermore, the housing 1 has a support spring 12 which is enclosed by gaps 10. The support spring 12 can be made by removing the wall material in the adjacent side walls 6 and 8. For example, by a cut-off process or punching. By removing the material, gaps 10 or recesses 10 are created, which surround the support spring 12 in the adjacent side walls 6 and 8. In other words, the support spring 12 is designed as a lamella, tongue, or spring tongue. The support spring 12 preferably starts in a first of the adjacent side walls 6, and the support spring 12 extends within this side wall 6 transversely to the longitudinal direction L, so that it transitions into the other of the adjacent walls 8 and from there extends along the longitudinal direction L within a plane defined by this second side wall 8. In other words, the support spring 12 forms a base 13 in the first side wall 6 and has a free end 16 in the other side wall 8. Within the other side wall 8, the support spring extends along the longitudinal direction L of the main body 4.

Furthermore, the support spring can be angled, have a knee 21, and have a support section 23 that is curved and projecting toward the lamella spring contact receptacle 5 between the knee 21 and the free end 16. In the support section, a welding window 24 of the support spring 12 can be arranged.

Furthermore, the support spring 12 preferably has a tip portion 14 which is arranged in the other of the adjacent side walls 8. In other words, the spring tongue designed as the support spring 12 initially extends transversely to the longitudinal direction L, starting at the base 13 in the first wall 6 towards the edge 7 between the two adjacent side walls 6 and 8. Furthermore, the spring tongue designed as the support spring 12 at the transition area of the edge has the bend around the longitudinal direction L, wherein the bending angle of the bend corresponds to the inner angle present between the two adjacent side walls 6 and 8. The tip portion 14 of the support spring 12 preferably includes a support portion 23. In other words, the tip portion 14 represents a tongue tip of the spring tongue.

The support spring 12 is resiliently supported in two transversal directions to the longitudinal direction L. The support spring 12 also has a rest point or a rest position, which can advantageously be used according to another embodiment. According to one exemplary embodiment, the surface side of the support spring 12 facing the lamella spring contact receptacle 5 or at least its tip portion 14 has an electrically conductive coating. For example, this coating is an alloy or a gold or silver coating. Alternatively or additionally, the tip portion 14 at the free end 16 of the support spring 12 is designed with a welding window 24. The welding window 24 can be formed as a gap or recess in the material of the side wall 8. The lamella spring contact 2 inserted into the housing 1 can be electrically conductively connected to the housing 1 at the tip portion 14 by laser welding. Alternatively, the housing 1 can be connected to the lamella spring contact 2 at the tip portion 14 by a soldering process.

Figure 2A:
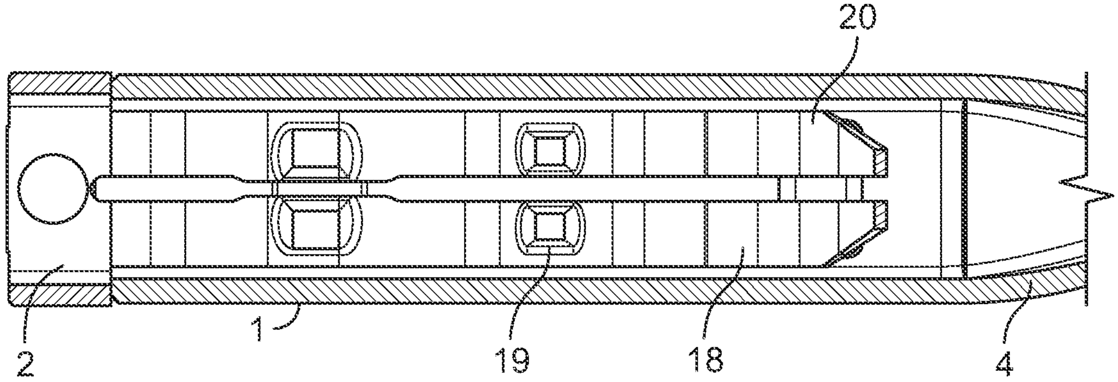
FIG. 2*a* illustrates a schematic sectional view of a housing according to an exemplary embodiment.

The electrical lamella spring contact 2 is described in more detail with reference to the schematic sectional view of a housing according to an exemplary embodiment in FIG. 2*a*. Preferably, the electrical lamella spring contact 2 is inserted into the housing 1. The main body 4 of the housing 1 can accommodate the electrical lamella spring contact 2 along the longitudinal direction L. The electrical lamella spring contact 2 can be formed with only one lamella spring 18. Alternatively, the electrical lamella spring contact 2 may have at least two lamella springs 18 and 20, hereinafter also referred to as the first lamella spring 18 and the second lamella spring 20. The at least two lamella springs 18 and 20 can be arranged parallel to each other and/or opposite each other. Furthermore, only one lamella spring 18 or the lamella springs 18 and 20 extend along the longitudinal direction L. The lamella springs 18 and 20 are designed as cantilevers, for example, and enable a resilient effect in a transverse direction to the longitudinal direction. The resilient effect of the lamella spring 18 or 20 can be supported by abutting or welding the support spring 12 to the electrical lamella spring contact 2.

Figure 2B:
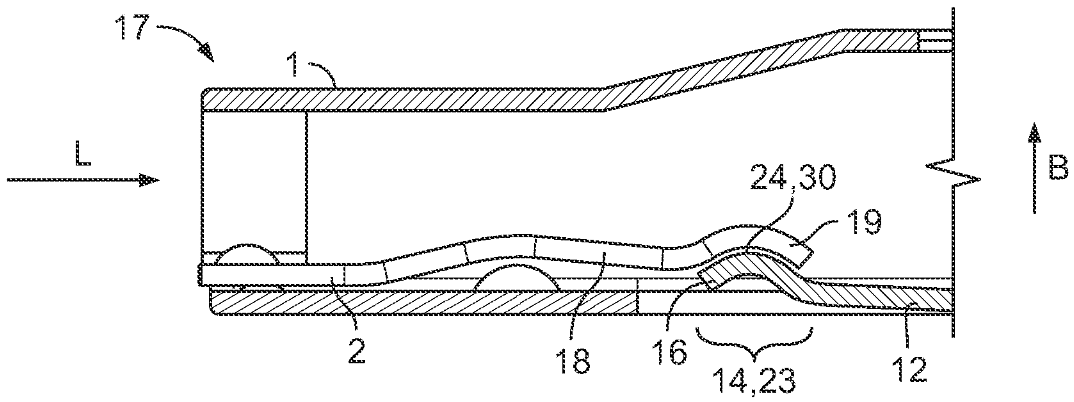
FIG. 2*b* illustrates a schematic side view of a housing according to an exemplary embodiment.

Using the schematic side view of a housing according to an exemplary embodiment in FIG. 2*b*, the operation of the housing 1 is explained in more detail. In the side view, the support spring 12 is shown in a projection view onto a plane defined by the longitudinal direction L and the width direction B of one side wall 8. The support spring 12 extends along the longitudinal direction L in the other of the adjacent side walls 8 and is designed to contact the lamella spring contact 2 or the lamella spring 18 at the tip portion 14 of the support spring 12. As shown in the exemplary embodiment in FIG. 2*b*, the tip portion 14 is complementary to the contacting or equally convex as the contacting area of the lamella spring contact 2 or the lamella spring 18. Furthermore, the contacting section 30 can have an electrically conductive coating and/or a welding window.

Figure 3A:
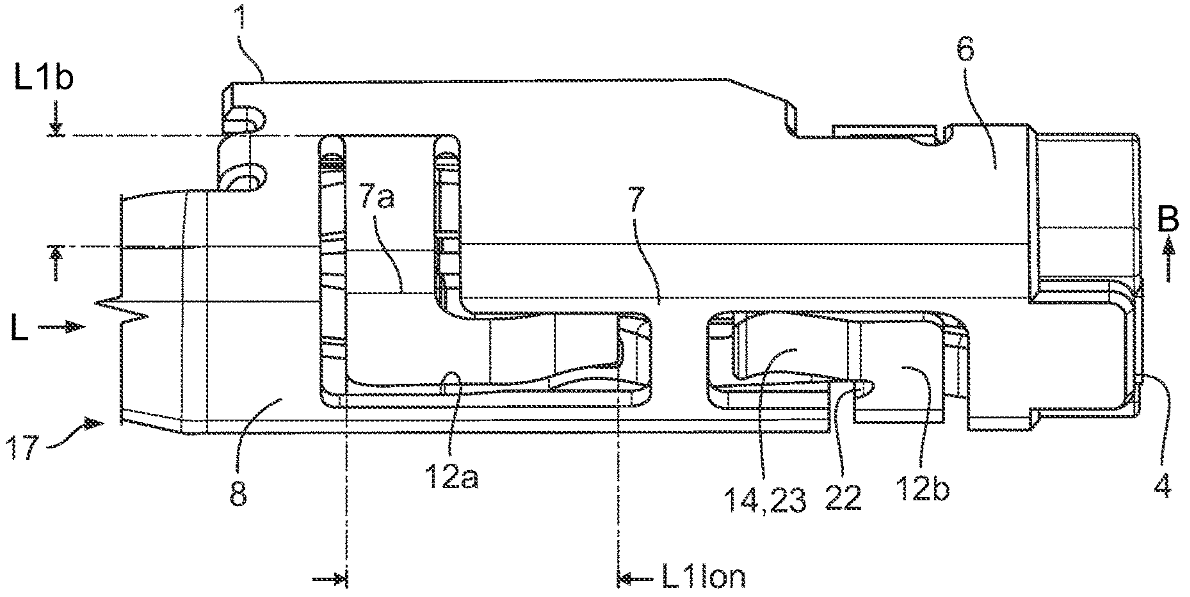
FIG. 3*a* illustrates a schematic perspective view of a housing according to an exemplary embodiment.

Using the schematic perspective view of a housing in FIG. 3*a*, further features of an exemplary embodiment that can be combined arbitrarily with the previously described embodiment are explained. As shown in FIG. 3*a*, the housing can have multiple support springs 12*a* and 12*b*. Both support springs 12*a* and 12*b* can start in the same first side wall 6 (not shown). In other words, their respective bases are in the same side wall. Alternatively, the second or further support spring 12*b* can start in a side wall opposite to the first side wall 8.

The first support spring 12*a* and the further support spring 12*b* can both extend along the longitudinal direction L. Alternatively, the further support spring 12*b* can extend in the opposite direction of the longitudinal direction L. In that case, the free ends of the two support springs are opposite each other. The first support spring 12*a* has an extension L1*b* in the width direction B of one side wall 6. Depending on the embodiment, the further support spring 12*b* may also have a length in the width direction B of the first side wall 6 (if the further support spring starts in the same side wall as the first mentioned support spring 12*a* or forms its base there) or the opposite, third side wall (if the further support spring 12*b* starts in the side wall opposite to the first side wall 6). Depending on the embodiment, the length L1*b* of the support spring 12*a* in the width direction B of the first flat side wall 6 may be longer or shorter than the length of the further support spring in the width direction.

Furthermore, the first support spring 12*a* has an extension L1lon in the longitudinal direction, or the further (second) support spring 12*b* has an extension L2lon in the longitudinal direction. The extensions L1lon and L2lon only concern the length of the support springs within the other side wall 8. Depending on the embodiment, the extension or length L1lon of the support spring 12*a* may be longer or shorter than the length L2lon of the further support spring 12*b*. Additionally, the support spring 12, 12*a*, or 12*b* may have a notch 22 (shown here only for the support spring 12*b*). Alternatively or additionally, the notch may be formed as a slot or a tooth. The notch 22 is preferably located at a core section of the support spring 12, namely where a section of the support spring 12 extending transversely to the longitudinal direction adjoins a section of the support spring 12 extending into the longitudinal direction within the same second flat wall 6. In other words, the notch 22 is in the same plane as the other side wall 8. For example, the notch 22 can be located at the throat of the knee 21 formed by the support spring 12*b*.

Figure 3B:
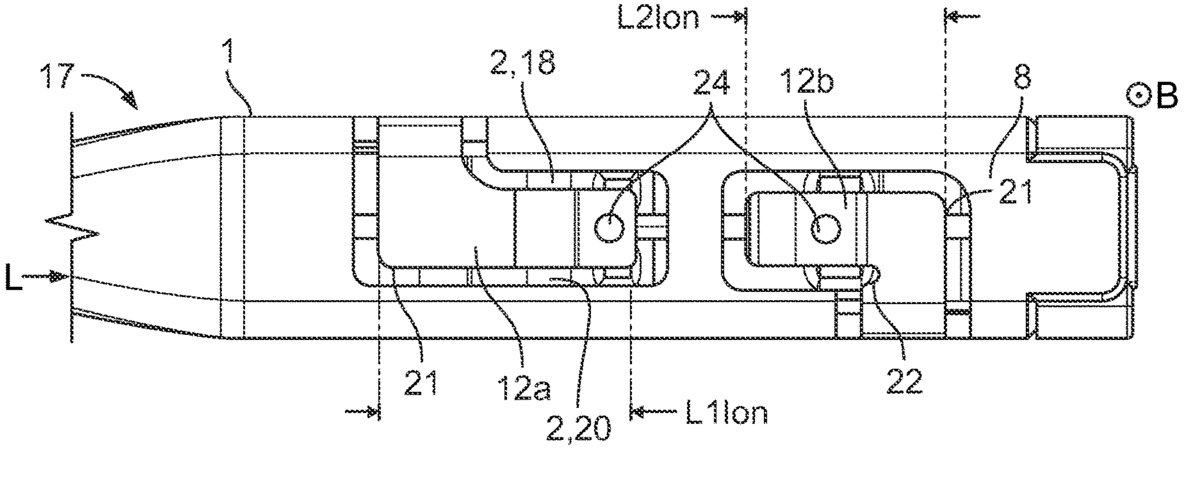
FIG. 3*b* illustrates a schematic top view of a housing according to the exemplary embodiments in FIG. 3*a*.

FIG. 3*b* shows a schematic top view of a housing according to the exemplary embodiment in FIG. 3*a*. The first support spring 12*a* or second support spring 12*b* each have a tip portion 14. According to an exemplary embodiment, one tip portion 14 has a welding window 24 and/or the other tip portion has an electrically conductive coating. A tip portion 14 can be designed to contact only one lamella spring 18 or multiple lamella springs 18 and 20 of the lamella spring contact 2.

Figure 4:
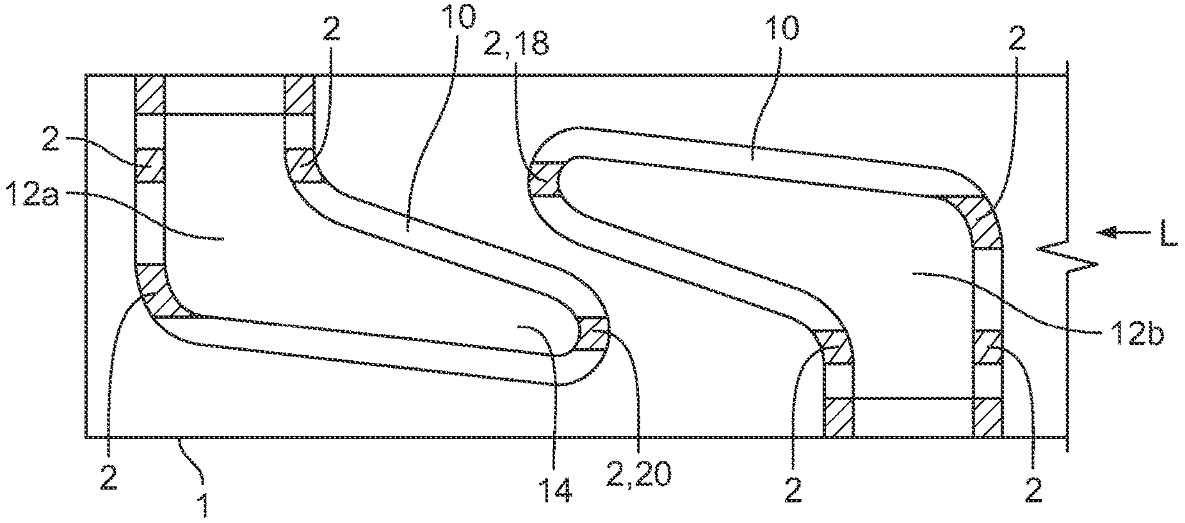
FIG. 4 illustrates a schematic sectional view of a housing according to another exemplary embodiment.

Using the schematic sectional view of a housing in FIG. 4, further features of an exemplary embodiment are described. FIG. 4 illustrates an exemplary embodiment of the housing 1 with two support springs 12*a* and 12*b*. The features described below can also be applied to a housing 1 with only one support spring 12. In FIG. 4, a projection view of the housing 1 within the other wall 8, defining a plane, is shown. The first support spring 12*a* extends at an acute angle to the longitudinal direction L from the core section to the free end 16. Furthermore, the first support spring 12*a* may also taper toward the free end. The further support spring 12*b* may also extend at an acute angle to the longitudinal direction L from the core section to the tip portion 14. Additionally, the further support spring 12*b* may taper toward the free end.

Figure 5A:
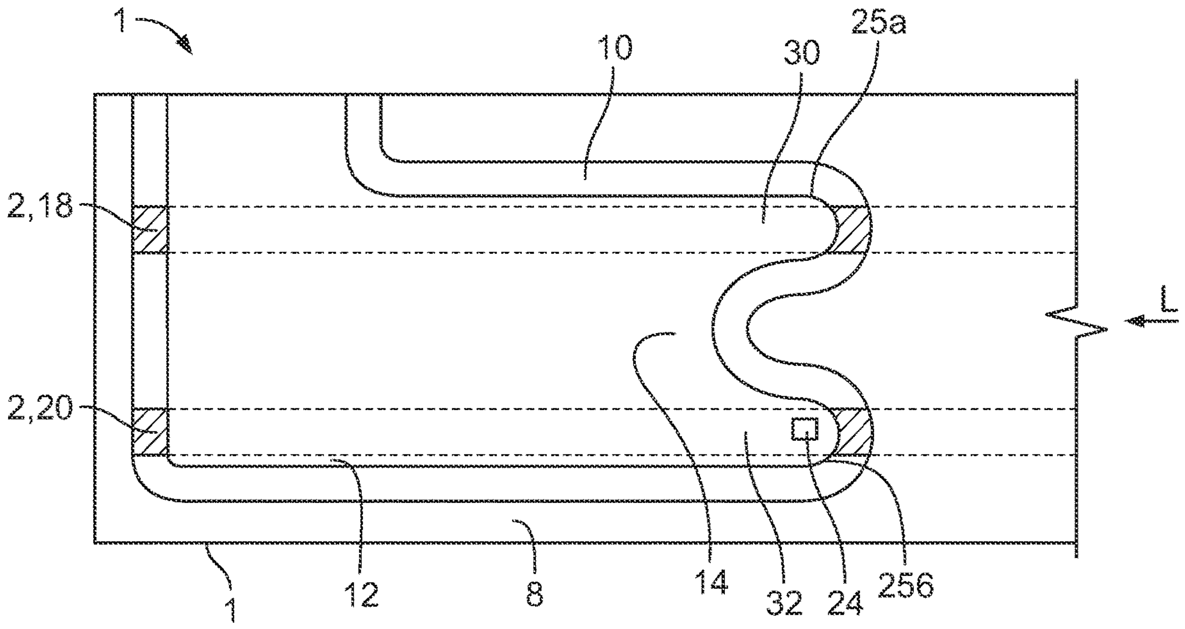
FIG. 5*a* illustrates a schematic sectional view of a housing according to another exemplary embodiment.
Figure 5B:
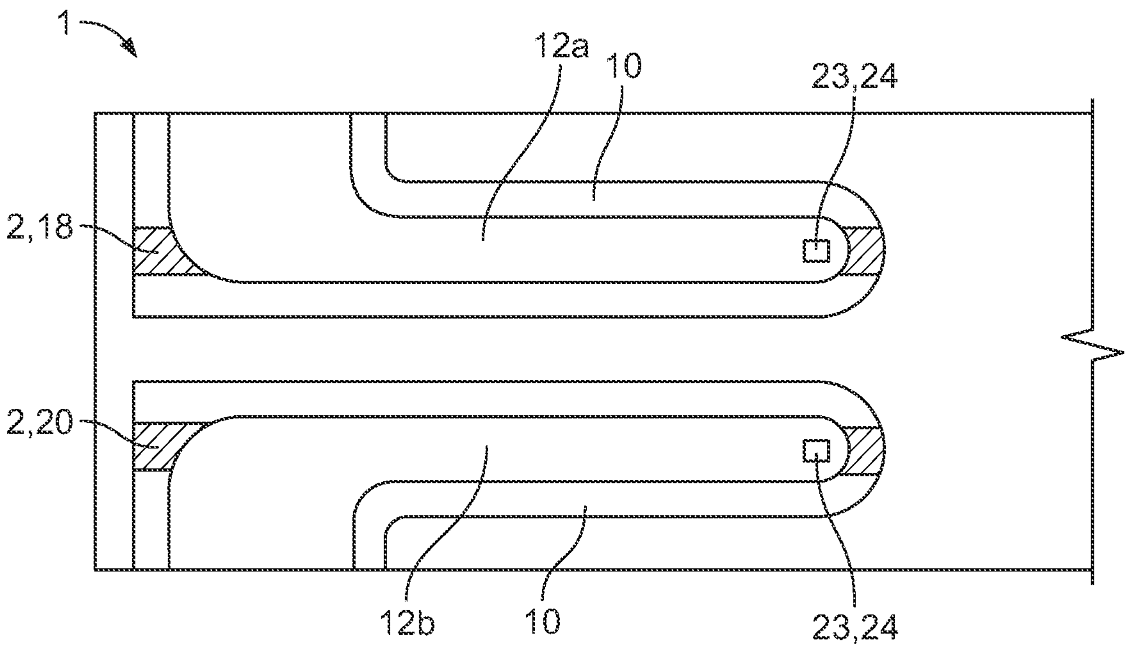
FIG. 5*b* illustrates a schematic sectional view of a housing according to another exemplary embodiment.
Figure 5C:
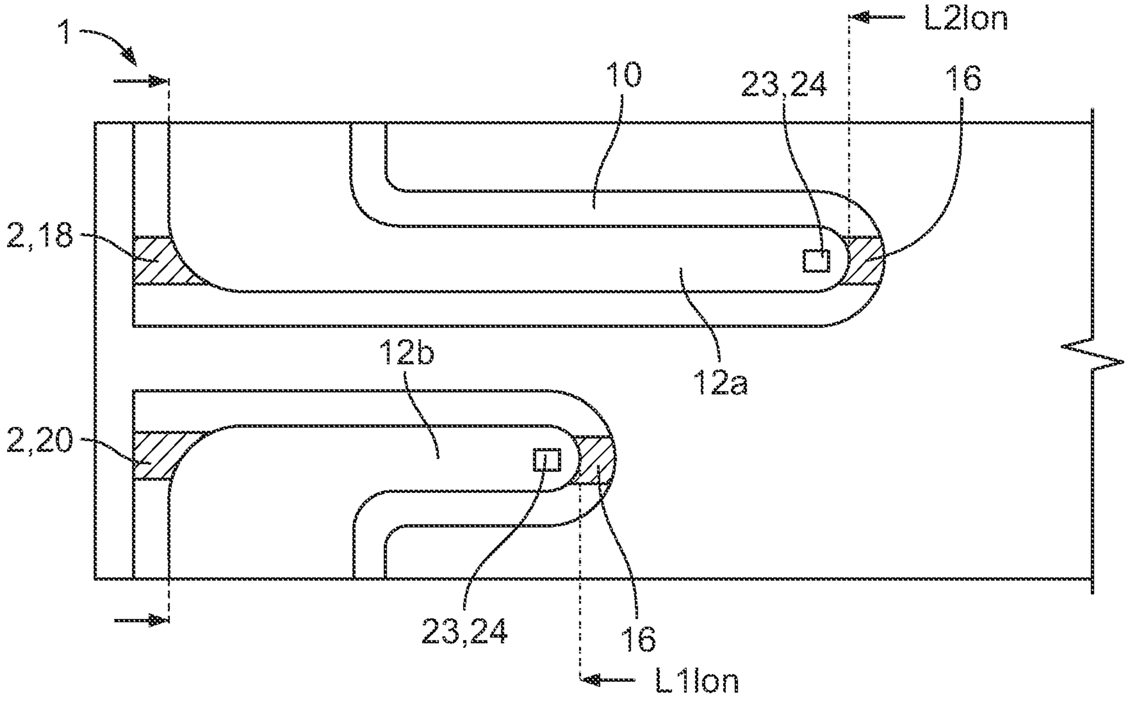
FIG. 5*c* illustrates a schematic sectional view of a housing according to another exemplary embodiment.

Using the schematic sectional view of a housing in FIG. 5*a* to 5*c*, further features of exemplary embodiments are described. In the embodiment shown in FIG. 5*a*, the support spring 12 of the housing 1 has a split tip portion 14. The free end may have multiple adjacent projections. These projections can each be formed like a tongue. In the illustrated embodiment, the tip portion 14 is divided into two projections 25*a* and 25*b*. Alternatively, the support spring can also be split into more than projections, for example, three or four. The number of projections of one support spring 12 may correspond to the number of lamella springs 18, 20 provided by the lamella spring contact 2 or be equal to it. Furthermore, one of the split tip portions or projections 25*a*, 25*b* may extend further in the longitudinal direction L than at least one other of the split tip portions or projections.

According to another exemplary embodiment, at least one of the split tip portions or projections 25*a*, 25*b* may taper toward the free end. Furthermore, at least one of the split tip portions or projections may have a welding window 24, or all of the split tip portions may have it.

In FIG. 5*b*, another exemplary embodiment with two support springs is shown. According to this embodiment, the base of the first support spring 12*a* is on one side wall 6, and the base of the other further support spring 12*b* is on the side wall opposite to the first side wall 6. Both support springs 12*a*, 12*b* can extend along the longitudinal direction L within the other side wall 8. They can be arranged parallel to each other so that they are adjacent to each other on the other side wall 8. In particular, the free end or the welding window 24 of the respective support spring may have the same distance from its respective base.

FIG. 5*c* presents an alternative to the embodiment in FIG. 5*a*, where one support spring 12*a* has a longitudinal extension L2lon longer than the other further support spring 12*b*.

Figure 6A:
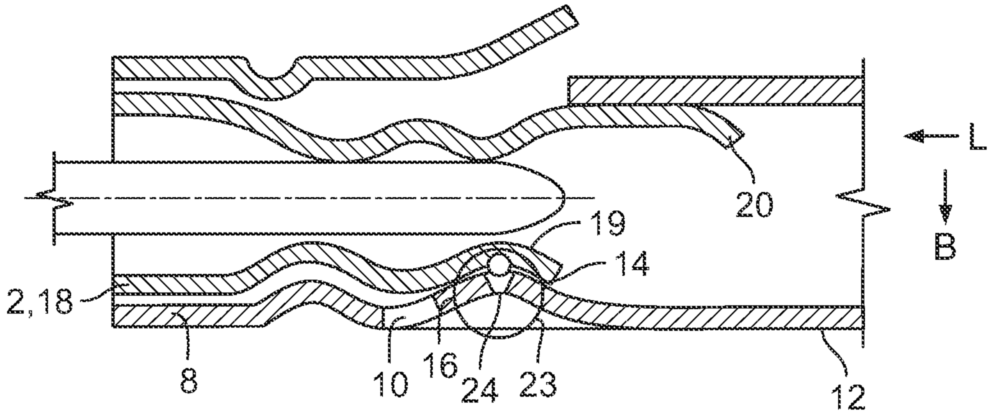
FIG. 6*a* illustrates a schematic side view of a housing according to another exemplary embodiment.

Using the schematic side view of a housing 1 in FIG. 6*a*, further features of an exemplary embodiment that can be combined arbitrarily are explained. The support spring 12 has a curvature in the tip portion 14 or in the support section 23. The tip portion 14 curves through the space or interior defined by the adjacent side walls 6 and 8. This curvature can engage with the lamella spring contact 2 or the lamella spring 18 in a form-fitting manner. For example, the curvature in the tip portion 14 has a convex shape.

According to another combinable embodiment, the support spring 12 may be connected to the lamella spring contact 2 or the lamella spring 18 by laser welding, wherein the support spring 12 has a welding window 24 at the outermost point of the curvature. The outermost point of the curvature is closest to the space or interior of the housing 1 defined by the side walls 6 and 8.

Figure 6B:
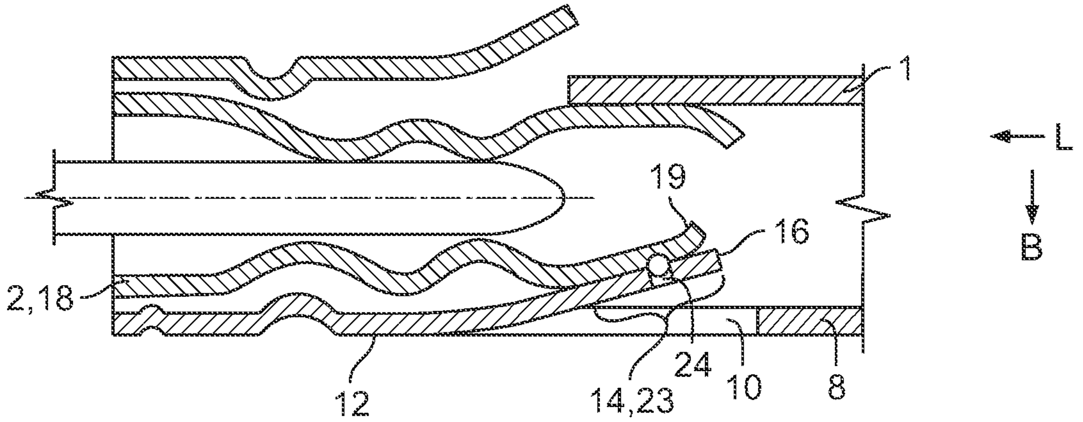
FIG. 6*b* illustrates a schematic side view of a housing according to another exemplary embodiment.

Using the schematic side view of another housing 1 in FIG. 6*b*, further features of an exemplary embodiment are explained. In contrast to the tip portion 14 shown in FIG. 6*a*, the tip portion 14 in the embodiment shown in FIG. 6*b* is flat or planar. It does not have a curvature. However, the tip portion 14 may have a bend towards the interior.

Figure 7A:
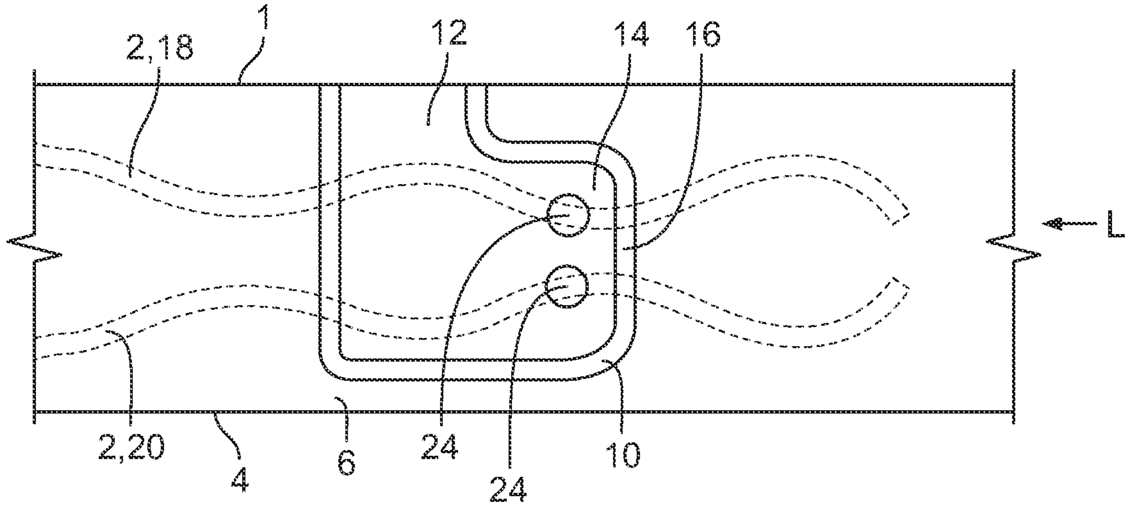
FIG. 7*a* illustrates a schematic sectional view of a housing according to another exemplary embodiment.

Using the schematic sectional view of a housing in FIG. 7*a*, further features of an exemplary embodiment are described. In the depicted embodiment, the support spring 12 has at least two contacting sections 30 and 32 at the free end 16 in the tip portion 14. Alternatively, the support spring 12 may have only one contacting section 30 in the tip portion 14. The two contacting sections 30 and 32 are designed to contact two opposite lamella springs 18 and 20 of an electrical lamella spring contact 2 received by the housing 1. The two lamella springs are each resiliently deflectable in the direction of the opposite lamella spring. Preferably, the housing is welded to the lamella springs 18 and 20 at the contacting sections 30 and 32. The support spring may have round, square, oval welding windows 24 at the contacting sections 30 and 32. The tip portion 14 of the support spring may extend transversely to the longitudinal direction L on the side wall. The embodiment shown in FIG. 7*a* can also be configured with two support springs. In particular, a first support spring may have its base in one side wall, and a second further support spring may have its base in a side wall opposite to the first side wall.

Figure 7B:
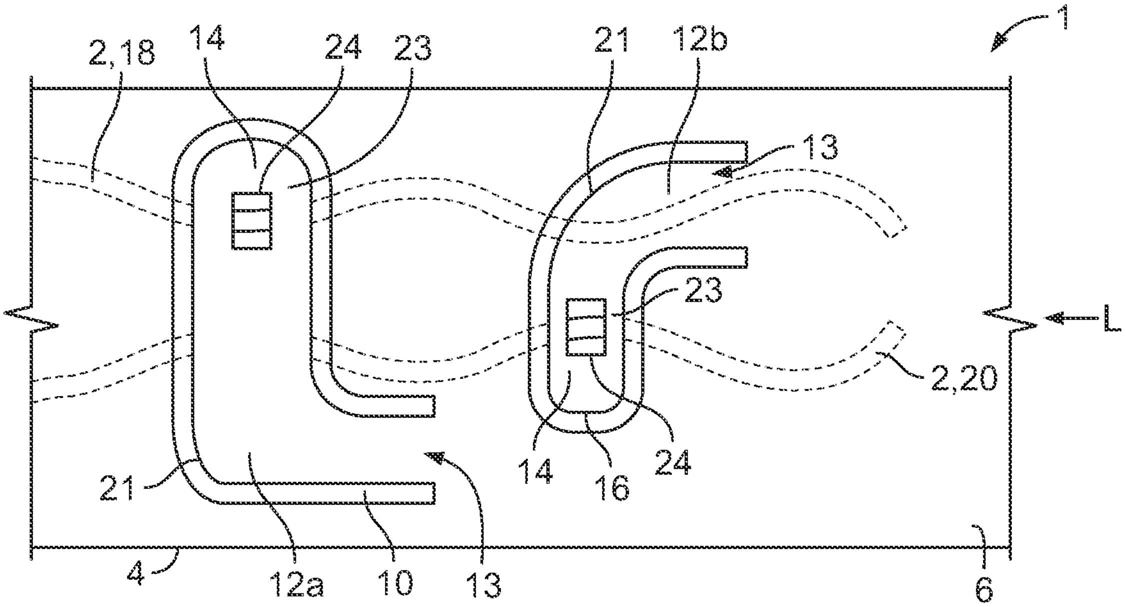
FIG. 7*b* illustrates a schematic sectional view of a housing according to another exemplary embodiment.

FIG. 7*b* shows another exemplary embodiment with two support springs 12*a* and 12*b*. As in the exemplary embodiment shown in FIG. 7*a*, in this embodiment, the support springs 12*a* and 12*b* are arranged laterally to the lamella springs 18 and 20. The first support spring 12*a* contacts one lamella spring 18, for example, at a first spring portion, and the further (second) support spring 12*b* contacts the other lamella spring 20, for example, at another spring portion. In the illustrated embodiment, the lamella springs 18 and 20 are arranged opposite each other in the housing 1. According to one embodiment, both or alternatively, only one of the support springs 12*a*, 12*b* may form a welding window 24 in the support section 23. The free ends 16 of the respective support springs 12*a* and 12*b* may be directed towards opposite side walls of the housing. The support springs 12*a* and 12*b* may be aligned against or along the longitudinal direction L. In particular, according to this embodiment, the respective tip portion of the support springs 12*a* and 12*b* may extend transversely to the longitudinal direction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. Housing for an electrical lamella spring contact configured to be mated with a pin contact, the housing comprising:

a lamella spring contact receptacle into which the lamella spring contact can be inserted along a longitudinal direction of the housing;

two side walls delimiting the lamella spring contact receptacle on adjacent sides, the side walls extending along the longitudinal direction, the side walls oriented such that one side wall of the two side walls is at an angle to an other side wall of the two side walls; and a support spring separate from the lamella spring contact and configured to press against the lamella spring contact for supporting a spring portion of the lamella spring contact, the support spring extending from the one side wall to the other side wall, wherein a free end of the support spring splits into multiple adjacent projections.

2. Housing according to claim 1, wherein the support spring is formed from the material of the side walls.

3. Housing according to claim 1, wherein the support spring is configured as a spring tongue.

4. Housing according to claim 1, wherein the side walls abut to form an edge of the housing, the support spring extends around the edge and also forms an edge of the support spring.

5. Housing according to claim 1, wherein the support spring is connected to one side wall via a base, and a free end of the support spring lies in the plane of the other side wall.

6. Housing according to claim 5, wherein the support spring tapers toward the free end.

7. Housing according to claim 5, wherein the support spring has a knee and between the knee and the free end has a support section curving and projecting toward the lamella spring contact receptacle.

8. Housing according to claim 7, wherein the support spring has a notch and/or a slot at the knee to reduce the spring stiffness of the support spring.

9. Housing according to claim 1, wherein the housing has a further support spring.

10. Housing according to claim 9, wherein the length of the further support spring is shorter than the length of the support spring.

11. Housing according to claim 9, wherein the housing has a third side wall opposite to the one side wall, wherein the further support spring extends from the third side wall to the other side wall.

12. Housing according to claim 9, wherein the free ends of the two support springs are offset from each other along a transverse direction to the longitudinal direction, or wherein the free ends of the support springs are positioned behind each other in the longitudinal direction.

13. Housing according to claim 1, wherein the support spring has a welding window and is designed to be connected through laser beam welding to a lamella spring contact that is insertable in the lamella spring contact receptacle.

14. Housing according to claim 1, wherein the two side walls of the housing includes a first side wall and a second side wall, the support spring includes a first portion stamped from and generally in the plane of the first side wall and a second portion stamped from and generally in the plane of the second side wall.

15. Contact assembly comprising:

a housing including a lamella spring contact receptacle extending along a longitudinal direction of the housing and configured to receive a pin contact, the lamella spring contact receptacle delimited by a first side wall and a second side wall on adjacent sides of the lamella spring contact receptacle, the first and second side walls extending along the longitudinal direction, the first side wall oriented at an angle to the second side wall, the housing including a support spring extending from the first side wall to the second side wall; and a lamella spring contact separate and discrete from the housing and located in the lamella spring contact receptacle to interface with the pin contact, the lamella spring contact including a lamella spring supported by the support spring;

wherein the support spring is separate from the lamella spring contact and presses against the lamella spring contact for supporting the lamella spring of the lamella spring contact.

16. Contact assembly according to claim 15, wherein the lamella spring is welded to the housing at the support section of the support spring.

17. Contact assembly according to claim 15, wherein the support spring and the lamella spring each have in the longitudinal direction successive sections which project and/or recede transversely to the longitudinal direction and in the direction to the lamella spring contact receptacle and engage with each other when the lamella spring is fully inserted into the lamella spring contact receptacle.

18. Contact assembly according to claim 15, wherein the support spring and the lamella spring each have a convex or concave shaped region, wherein the convex or concave shaped region of the support spring and the lamella spring are form-fittingly engaged with each other when the lamella spring is fully inserted into the lamella spring contact receptacle.

19. Contact assembly according to claim 15, wherein the support spring and the lamella spring each have a plane-parallel end region, wherein the end region of the support spring contacts the end region of the lamella spring when the lamella spring is fully inserted into the lamella spring contact receptacle, wherein the support spring is bent in its end region transversely to the longitudinal direction towards the lamella spring contact receptacle.

* * * * *